(12) United States Patent
Dover (10) Patent No.: US 11,611,433 B2
(45) Date of Patent: *Mar. 21, 2023

(54) SECURE MEMORY ARRANGEMENTS

(71) Applicant: Micron Technology, Inc., Boise, ID (US)

(72) Inventor: Lance W. Dover, Fair Oaks, CA (US)

(73) Assignee: Micron Technology, Inc., Boise, ID (US)

( * ) Notice: Subject to any disclaimer, the term of this patent is extended or adjusted under 35 U.S.C. 154(b) by 183 days.

This patent is subject to a terminal disclaimer.

(21) Appl. No.: 16/748,244

(22) Filed: Jan. 21, 2020

(65) Prior Publication Data

US 2020/0235916 A1    Jul. 23, 2020

Related U.S. Application Data (63) Continuation of application No. 15/692,802, filed on Aug. 31, 2017, now Pat. No. 10,560,263.

(Continued)

(51) Int. Cl.
*H04L 9/08* (2006.01)
*H04L 9/40* (2022.01)
(Continued)

(52) U.S. Cl.
CPC .............. *H04L 9/083* (2013.01); *G06F 21/78* (2013.01); *H04L 9/006* (2013.01); *H04L 9/3242* (2013.01);
(Continued)

(58) Field of Classification Search
CPC ....... H04L 9/083; H04L 9/006; H04L 9/3242; H04L 9/3247; H04L 63/0428; H04L 9/30;
(Continued)

(56) References Cited

U.S. PATENT DOCUMENTS 9,083,581 B1 * 7/2015 Addepalli ............... G06F 3/017
9,660,970 B1    5/2017 Rubin et al.
(Continued)

FOREIGN PATENT DOCUMENTS

CN    1249096    3/2000
CN    103649950   3/2014
(Continued)

OTHER PUBLICATIONS

"European Application Serial No. 18770265.9, Response filed May 18, 2020 to Communication pursuant to Rules 161(2) and 162 EPC dated Nov. 6, 2019", 18 pgs.

(Continued)

*Primary Examiner* — Techane Gergiso
(74) *Attorney, Agent, or Firm* — Schwegman Lundberg & Woessner, P.A.

(57) ABSTRACT

Various examples are directed to secure memory arrangements and methods of using the same. A gateway device of the secure computing system may receiving a first message from an external system. The first message may comprise a first message payload data and first asymmetric access data. The gateway device may determine that the first asymmetric access data matches the first message payload data based at least in part on an external system public key. The gateway device may access a first system controller symmetric key associated with a first system controller in communication with the gateway device and generate a first symmetric access data based at least in part on the first system controller symmetric key and the first message payload data. The gateway device may send the first message payload data and the first symmetric access data to the first system controller.

21 Claims, 7 Drawing Sheets

Related U.S. Application Data (60) Provisional application No. 62/476,598, filed on Mar. 24, 2017.

(51) Int. Cl.
  *H04L 9/00* (2022.01)
  *H04L 9/32* (2006.01)
  *G06F 21/78* (2013.01)
  *H04L 9/30* (2006.01)

(52) U.S. Cl.
  CPC ........ *H04L 9/3247* (2013.01); *H04L 63/0428* (2013.01); *H04L 9/30* (2013.01); *H04L 63/12* (2013.01); *H04L 63/126* (2013.01); *H04L 2209/76* (2013.01)

(58) Field of Classification Search
  CPC ... H04L 63/12; H04L 63/126; H04L 2209/76; H04L 63/0823; H04L 9/0825; H04L 9/14; H04L 2012/40215; H04L 9/0643; H04L 9/08; H04L 29/06; H04L 9/00; H04L 12/66; H04L 2209/12; G06F 21/78; G06F 21/57; G06F 21/572; G06F 21/64; G06F 21/44; G06F 12/1408; H04W 4/40; H04W 12/04; H04W 4/44; H04W 4/48; H04W 4/70; H04W 12/041; H04W 12/10
  See application file for complete search history.

(56) References Cited

U.S. PATENT DOCUMENTS

| | | | |
|---|---|---|---|
| 10,560,263 | B2 | 2/2020 | Dover |
| 2002/0004899 | A1 | 1/2002 | Azuma |
| 2002/0199110 | A1 | 12/2002 | Kean |
| 2006/0101506 | A1 | 5/2006 | Gallo et al. |
| 2009/0172401 | A1 | 7/2009 | Cizas et al. |
| 2010/0318468 | A1 | 12/2010 | Carr |
| 2011/0154059 | A1 | 6/2011 | Durham et al. |
| 2012/0018506 | A1 | 1/2012 | Hammad et al. |
| 2012/0243541 | A1 | 9/2012 | Zhao et al. |
| 2012/0300932 | A1 | 11/2012 | Cambridge et al. |
| 2012/0300938 | A1 | 11/2012 | Kean et al. |
| 2013/0007219 | A1* | 1/2013 | Sorenson, III ...... H04L 67/1095 709/219 |
| 2013/0232339 | A1 | 9/2013 | Ignatchenko et al. |
| 2014/0165153 | A1 | 6/2014 | Dabbiere et al. |
| 2015/0270968 | A1 | 9/2015 | Nairn et al. |
| 2016/0012653 | A1* | 1/2016 | Soroko ................ G07C 9/20 340/5.61 |
| 2016/0072781 | A1* | 3/2016 | Zhang ................ H04L 67/1044 726/4 |
| 2016/0315766 | A1* | 10/2016 | Ujiie .................. H04L 63/0428 |
| 2016/0344705 | A1* | 11/2016 | Stumpf ................ H04L 9/3213 |
| 2016/0344715 | A1 | 11/2016 | Kumar et al. |
| 2017/0019251 | A1 | 1/2017 | Jain et al. |
| 2017/0111177 | A1* | 4/2017 | Oguma ................ H04L 9/3273 |
| 2017/0171174 | A1 | 6/2017 | Campagna |
| 2017/0250964 | A1 | 8/2017 | Edwards et al. |
| 2017/0338961 | A1* | 11/2017 | Cho ................ H04L 9/3242 |
| 2017/0339115 | A1* | 11/2017 | Cho ................ H04W 12/062 |
| 2018/0048473 | A1* | 2/2018 | Miller ................ H04L 9/14 |
| 2018/0076959 | A1* | 3/2018 | Komano ................ G09C 1/00 |
| 2018/0270052 | A1* | 9/2018 | Cullen ................ H04L 9/0822 |
| 2018/0278413 | A1 | 9/2018 | Dover |
| 2018/0331824 | A1 | 11/2018 | Racz et al. |
| 2019/0028448 | A1* | 1/2019 | Farrell ................ H04W 4/48 |

FOREIGN PATENT DOCUMENTS

| | | |
|---|---|---|
| CN | 110612699 A | 12/2019 |
| EP | 2056229 | 5/2009 |
| JP | 2012204895 | 10/2012 |
| KR | 20000070624 | 11/2000 |
| KR | 102390810 | 4/2022 |
| WO | WO-2018175925 A1 | 9/2018 |

OTHER PUBLICATIONS

"International Application Serial No. PCT/US2018/024084, International Preliminary Report on Patentability dated Oct. 3, 2019", 6 pgs.

"International Application Serial No. PCT/US2018/024084, International Search Report dated Jul. 5, 2018", 3 pgs.

"International Application Serial No. PCT/US2018/024084, Written Opinion dated Jul. 5, 2018", 4 pgs.

"Japanese Application Serial No. 2019-552568, Notification of Reasons for Refusal dated Feb. 2, 2021", w English Translation, 6 pgs.

"Japanese Application Serial No. 2019-552568, Response filed Apr. 2, 2021 to Notification of Reasons for Refusal dated Feb. 2, 2021", w English Translation, 11 pgs.

"Korean Application Serial No. 10-2019-7031517, Notice of Preliminary Rejection dated Jul. 26, 2021", w English translation, 5 pgs.

"European Application Serial No. 18770265.9, Extended European Search Report dated Nov. 10, 2020", 10 pgs.

"European Application Serial No. 18770265.9, Response filed Jun. 7, 2021 to Extended European Search Report dated Nov. 10, 2020", 111 pgs.

"Japanese Application Serial No. 2019-552568, Examiners Decision of Final Refusal dated Oct. 5, 2021", w English translation, 8 pgs.

"Korean Application Serial No. 10-2019-7031517, Response filed Sep. 23, 2021 to Notice of Preliminary Rejection dated Jul. 26, 2021", w English Claims, 16 pgs.

"Chinese Application Serial No. 201880028961.X, Office Action dated Nov. 30, 2021", w English translation, 11 pgs.

Li, Naiyong, "Accurate fault identification method based on real-time station map mapping", Power System Protection and Control, Issue 08, (Apr. 16, 2015), 6 pgs.

Telang, R, "The market structure for Internet search engines", Journal of Management Information Systems, (Dec. 31, 2004), 24 pgs.

"Chinese Application Serial No. 201880028961.X, Response filed Apr. 1, 2022 to Office Action dated Nov. 30, 2021", w English Claims, 120 pgs.

* cited by examiner

SECURE MEMORY ARRANGEMENTS

PRIORITY APPLICATION

This application is a continuation of U.S. application Ser. No. 15/592,802, filed Aug. 31, 2017, which claims the benefit of priority to U.S. Provisional Ser. No. 62/476,598, filed Mar. 24, 2017, all of which are incorporated herein by reference in their entireties.

TECHNICAL FIELD

Examples described herein generally relate to systems and methods for securing computing system memory from unauthorized access.

BACKGROUND

A common form of attack against processing systems involves installing malicious code to a memory device of the system. The malicious code is then executed by the processing system. When executed, the malicious code may enable data theft, unauthorized control of the processing system, and other negative consequences.

BRIEF DESCRIPTION OF THE DRAWINGS

In the drawings, which are not necessarily drawn to scale, like numerals may describe similar components in different views. Like numerals having different letter suffixes may represent different instances of similar components. Some examples are illustrated by way of example, and not limitation, in the figures of the accompanying drawings in which.

DETAILED DESCRIPTION

In the following description, for purposes of explanation, numerous specific details are set forth in order to provide a thorough understanding of some examples. It will be evident, however, to one skilled in the art that the present disclosure may be practiced without these specific details.

Various examples described herein are directed to systems and methods for securing memory arrangements that may be found in various forms of data processing systems (also referred to herein as processing systems). In some examples, the secure memory arrangements described herein are used in processing systems incorporated with various apparatuses such as, for example, appliances, vehicles, industrial equipment, Internet of Things (IoT) devices, etc. Such processing systems may include, for example, embedded systems or other systems for control or communication. Other examples of processing systems that that may utilize the memory arrangements described herein include laptop computers, desktop computers, mobile computing devices, servers, etc.

In some examples, the systems and methods described herein utilize access control to secure a memory arrangement at a processing system. For example, a processing system utilizing a secure memory arrangement described herein may prevent writes to all or a portion of its associated memory storage locations unless the writes are accompanied by access data demonstrating that the sending party had possession of a cryptographic key. In some examples, any other type of shared secret may be used in place of the cryptographic key. In some examples, access to all storage locations of a memory arrangement may be controlled in this way. In other examples, only a portion of storage locations are access-controlled, such as storage locations including boot code or other important software.

A write request to an access-controlled storage location or locations may include payload data and access data. Upon receiving the write request, the memory arrangement may use a cryptographic key and the payload data to verify the access data, for example, by performing a cryptographic operation based on the access data and the payload data. If the cryptographic operation (e.g., a result or results thereof) is consistent with the access data, then the access data is verified and the processing system executes the write request by writing the payload data to the storage device. If the cryptographic operation is inconsistent with the access data, then the access data is not verified and the processing system refuses the write request.

Although the access control described herein may be implemented in software executed by a processor unit distinct from a memory device, some examples described herein implement access control at the memory device level. For example, a secure memory device may include a key register for storing a shared secret, such as a cryptographic key, and a cryptographic engine for generating and/or verifying access data. When a write request is received, the memory device verifies the access data by providing the write request payload data and the cryptographic key from the key register the cryptographic engine. The cryptographic engine may perform one or more cryptographic operations, such as hashing, decryption, etc., to verify the access data. If the access data is verified, the memory device completes the requested write. If the access data is not verified, the memory device rejects the write request.

Access control, described herein, may be implemented with a symmetric key or with asymmetric keys. When a symmetric key is used, both the sending party and the receiving party have copies of the same symmetric key. The sending party generates the access data using the symmetric key. For example, the sending party may generate access data by applying a hash function to payload data using the symmetric key. The resulting hash makes up all or a part of the access data. The resulting hash is, in some examples, referred to as a Message Authentication Code (MAC) and in some examples referred to as a Hash Message Authentication Code (HMAC).

The sending party sends to the receiving party a write request including the payload data and the access data. The receive party, which also has a copy of the symmetric key, generates an access data copy. For example, the receiving party may generate the access data copy by independently hashing the payload data with the receiving party's own copy of the symmetric key. If the access data copy is equivalent to the received access data, the message is verified.

When asymmetric keys are used, the sending party has a private key, which is secret, and a public key, which is not secret. The sending party sometimes utilizes a certificate authority or other trusted third party to verify the authenticity of its public key to the receiving party. The sending party's private and public keys are mathematically related such that certain cryptographic operations performed with the private key may be reversed using the public key.

The sending party generates access data utilizing the payload data and the sending party's own private key. For example, the sending party may apply a hash function to the payload data and then sign the resulting hash with the sending party's private key. The result is a cryptographic signature that may make up all or part of the access data. The receiving party may decrypt the signature with the sending party's public key, and then generate an access data copy by applying the same hash function to the received payload data. If the access data copy is equivalent to the decrypted signature, then the message is verified.

Symmetric and asymmetric access control both have advantages and disadvantages. For example, symmetric configurations require that the parties securely communicate the symmetric key to one another. In some examples, the process of communicating a symmetric key between parties to a communication is called provisioning. It can be challenging to provision a single symmetric key to both parties while keeping the symmetric key secret. On the other hand, asymmetric configurations may be easier to provision. For example, the sending party's public key is not secret, and may be sent in the clear without the security concerns associated with symmetric keys. Also, the cryptographic operations for verifying access data generated with asymmetric keys are often more complex. For example, some asymmetric configurations use cryptographic keys that are an order of magnitude larger than the keys used with similarly-secure symmetric configurations. The added complexity of cryptographic operations in asymmetric configurations can require more hardware and/or software resources to implement.

In some processing systems, such as in larger computing devices, the added bill of material (BOM) and/or other costs associated with asymmetric access control are marginal. In other processing systems, the added costs of asymmetric access control are more significant. For example, embedded systems, IoT devices, and other similar processing systems or components may have low enough overall costs that the addition of asymmetric access control adds significantly to the price of each component. In large systems, such as an automobiles, security systems, etc., adding asymmetric access control to each embedded system memory device may add significant cost.

Various examples described herein are directed to processing systems and memory arrangements that include a gateway device and one or more system controllers. The gateway device includes one or more memory devices that support both asymmetric and symmetric access control. The system controllers include memory devices that support symmetric access control. In some examples, however, the memory device or devices at the systems controllers need not support asymmetric access control. In this way, the added expense of asymmetric access control may not be necessary for each system controller.

The gateway device memory device, which supports both symmetric and asymmetric access control, may act as a key store for the symmetric keys of the memory devices at the various controller systems. For example, an external system may generate an external message directed to one of the system controllers (a recipient system controller). The external message may include payload data and asymmetric access data generated with the private key of the external system. The gateway device receives the message and verifies it using the public key of the external system. The gateway device then retrieves the appropriate symmetric key of the system controller to which the message is directed and generates symmetric access data, which may be specific to the recipient system controller. The gateway device sends an internal message, including the payload data and symmetric access data, to the recipient system controller. The recipient system controller, or a system memory device at the system controller, verifies the symmetric access data and writes the payload data to its memory.

Figure 1:
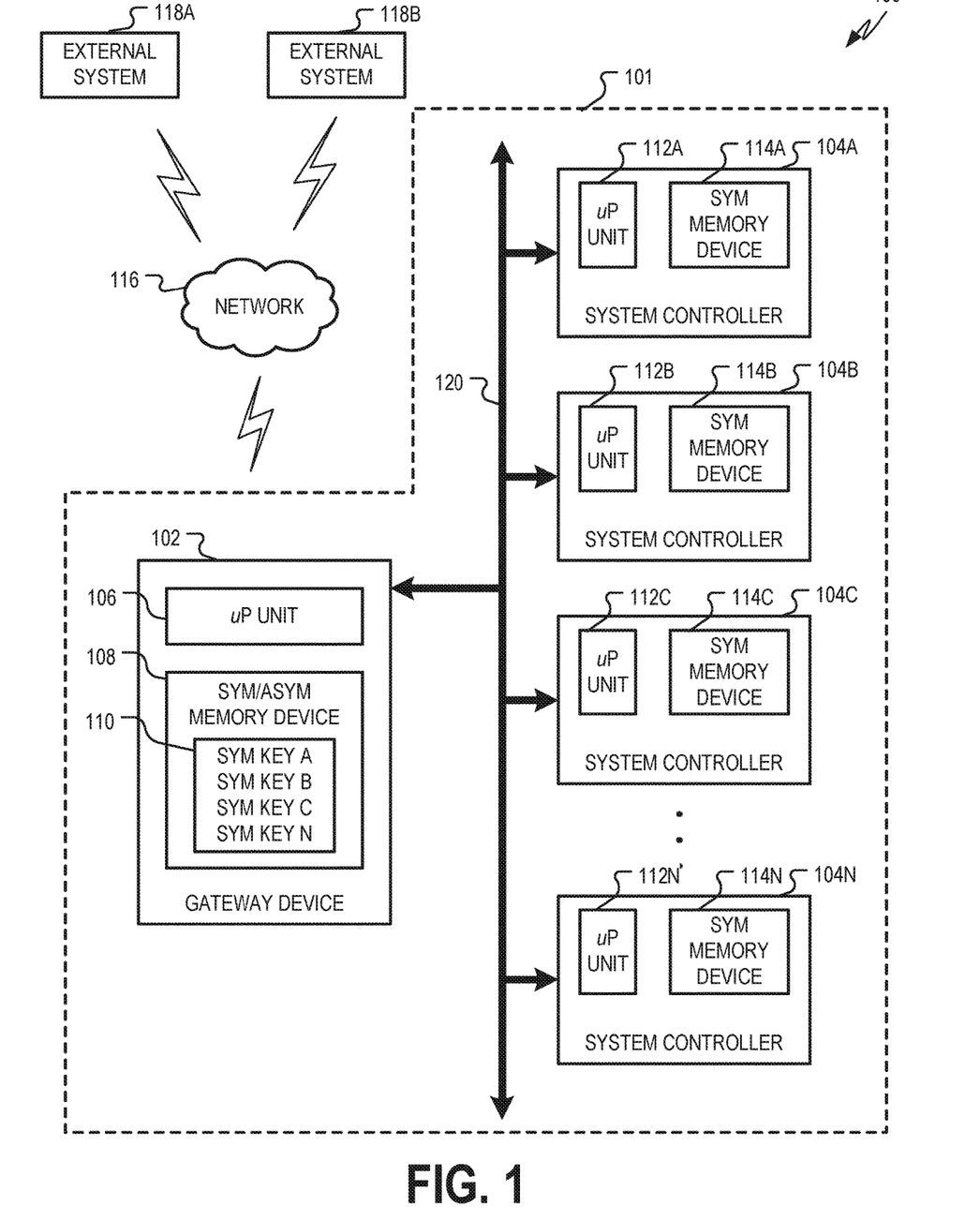
FIG. 1 is a diagram showing one example of an environment for implementing a secure computing system.

FIG. 1 is a diagram showing one example of an environment 100 for implementing a secure processing system 101 in communication with example external systems 118A, 118B via a network 116. The secure processing system 101 comprises a gateway device 102 and a number of system controllers 104A, 104B, 104C, 104N. The gateway device 102 and system controllers 104A, 104B, 104C, 104N are in communication via a bus 120, which may be any suitable form of wired or wireless bus. Although four system controllers 104A, 104B, 104C, 104N are shown in the example environment 100, any suitable number of system controllers may be used including, for example, more or fewer than are shown in FIG. 1.

The system controllers 104A, 104B, 104C, 104N, in some examples, may be embedded systems for controlling mechanical or electrical systems or sub-systems in any suitable setting. In some examples, the secure processing system 101 may be implemented in an automobile or other vehicle. Each system controller 104A, 104B, 104C, 104N may manage a component of the automobile. For example, the system controller 104A may manage an anti-lock braking system, the system controller 104B may manage a fly-by-wire throttle system, the system controller 104C may manage a backup camera, the system controller 104N may manage an entertainment system, etc. In examples where the secure processing system 101 is implemented in an automobile or other vehicle, the bus 120 may be configured according to the Controller Area Network (CAN) vehicle bus standard. In another example, the secure processing system 101 may be implemented in a security system. The respective system controllers 104A, 104B, 104C 104N may manage various cameras, sensors, etc. of the security system. In yet another example, the secure processing system 101 may be implemented as part of an appliance, such as a refrigerator. The respective system controllers 104A, 104B, 104C, 104N may manage various displays, thermostats, etc., of the appliance.

The system controllers 104A, 104B, 104C, 104N may include respective processor units 112A, 112B, 112C, 112N and respective symmetric memory devices 114A, 114B, 114C, 114N. The symmetric memory devices 114A, 114B, 114C, 114N may be configured to support symmetric access control, for example, as shown in more detail in FIG. 2. Symmetric memory devices 114A, 114B, 114C, 114N, in some examples, store code to be executed by the processor units 112A, 112B, 112C, 112N. Symmetric memory devices 114A, 114B, 114C, 114N, in some examples, are persistent memory devices, such as, for example, solid state memory devices such as flash devices.

The gateway device 102 comprises a sym/asym memory device 108. A sym/asym memory device 108 is a memory device that supports both symmetric and asymmetric access control, for example, as described herein. In some examples, the gateway device 102 also comprises a processor unit 106.

The sym/asym memory device 108 includes a key store area 110 that includes one or more storage locations for storing symmetric keys for the respective symmetric memory devices 114A, 114B, 114C, 114N. The sym/asym memory device 108 may manage access to the key store area 110 with asymmetric access control. Accordingly, although the key store area 110 includes symmetric keys for the respective symmetric memory devices 114A, 114B, 114C, 114N, the key store area 110 itself is access controlled with an asymmetric key pair of the sym/asym memory device 108, as described herein.

The sym/asym memory device 108 may be configured to receive and process asymmetric access data, for example, in communications with external systems 118A, 118B. The sym/asym memory device 108 may also be configured to receive and process symmetric access data, for examples, utilizing the symmetric keys stored at the key store area 110.

The gateway device 102 may be in communication with the external systems 118A, 118B via a network 116. The network 116 may be or comprise any suitable network element operated according to any suitable network protocol. For example, one or more portions of network 116 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, another type of network, or a combination of two or more such networks.

Figure 2:
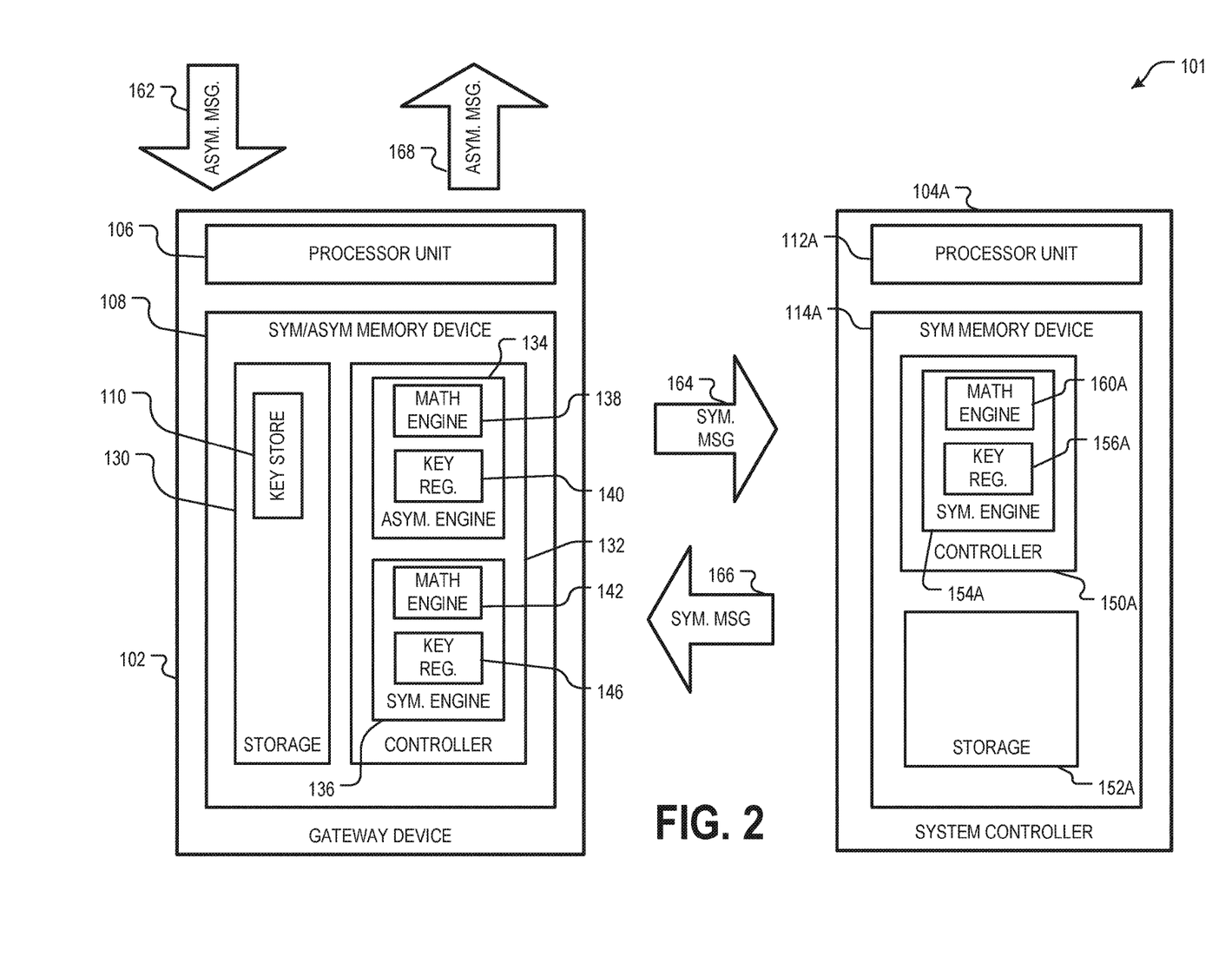
FIG. 2 is a diagram showing a portion of the secure computing system including additional details of the gateway device and the system controller.

FIG. 2 is a diagram showing a portion of the secure processing system 101 including additional details of the gateway device 102 and the system controller 104A. Referring now to the gateway device 102, FIG. 2 shows additional details of the sym/asym memory device 108. For example, the sym/asym memory device 108 includes a controller 132 and storage 130. In some examples, the sym/asym memory device 108 may be or include flash or other similar solid state memory. In some examples, the sym/asym memory device 108, including the storage 130 and controller 132, may be implemented on an embedded Multi-Media Controller (eMMC) device on a common semiconductor (e.g., silicon) die.

The storage 130 includes the key store 110, which may store symmetric keys for one or more system controllers 104A, 104B, 104C, 104N. In some examples, the key store 110 is asymmetrically access controlled, for example, as described herein. The controller 132 may include various hardware for managing the storage 130 including, for example, hardware for performing addressing, data reading and writing, etc.

The controller 132, in some examples, includes an asymmetric engine 134 and a symmetric engine 136. The asymmetric engine 134 may be used to implement the asymmetric access control of the key store 110. The asymmetric engine 134 may include one or more key registers 140 and a math engine 138. Although the key register 140 is shown as a component of the asymmetric engine 134, in some examples, the key register 140 may be positioned elsewhere, for example, at a secured location in storage 130. In some examples, the key register 140 may store a private key for the sym/asym memory device 108. The math engine 138 may be configured to perform cryptographic operations for implementing asymmetric access control, as described herein. For example, the math engine 138 may be configured to receive payload data (or a hash of payload data) and a private key to generate access data, for example, including a digital signature as described herein. The math engine 138 may also be configured to receive encrypted data and a public key to generate decrypted or clear data. In some examples, the asymmetric engine 134 may be or include an RSA engine.

The symmetric engine 136 may include a key register 146 and math engine 142. The key register 146, for example, may store a symmetric key of the sym/asym memory device 108. Although the key register 146 is shown as part of the symmetric engine 136, in some examples, it is positioned elsewhere, for example, at a secured location in the storage 130. The math engine 142 is configured to perform cryptographic operations for implementing symmetric access control, as described herein. For example, the math engine 142 may be configured to receive payload data and a symmetric key and return a hash based on the payload data and the symmetric key.

The system controller 104A may include the symmetric memory device 114A introduced above. The symmetric memory device 114A may include storage 152A and a controller 150A. In some examples, the symmetric memory device 114A may be a NOR device with the controller 150A and storage 152A implemented on the same semiconductor die. The storage 152A, in some examples, may store instructions executable by the processor unit 112A to control a system. For example, when the secured processing system 101 is implemented in an automobile or other vehicle, the storage 152A may include instructions that, when executed by the processor unit 112A, cause the processor unit 112A to control the operation of a vehicle subsystem such as, an anti-lock braking system, a fly-by-wire throttle system, etc. All or portions of the storage 152A may be access controlled, as described herein. In some examples, a portion of the storage 152A including boot instructions for the processor unit 112A, mission-critical software, etc., is access controlled while other portions of the storage 152A are not access controlled.

The controller 150A, like the controller 132, may include various hardware for managing the storage 152A including, for example, hardware for performing addressing, data reading and writing, etc. The controller 132 may also include a symmetric engine 154A, which may include a math engine 160A and key register 156A similar to the math engine 138 and key register 140 of the sym/asym memory device 108 described herein.

FIG. 2 also shows a workflow for sending messages to and from the system controller 104A and its symmetric memory device 114A. In the example of FIG. 2, an asymmetric message 162 is received from an external system, such as one of the external systems 118A, 118B. The asymmetric message 162 includes payload data and asymmetric access data. The processor unit 106 requests that the asymmetric message 162 be written to the sym/asym memory device 108. The sym/asym memory device 108 controller 132 utilizes the asymmetric engine 134 to verify the asymmetric access data. If the asymmetric access data is verified, the controller 132 accesses a symmetric key for the system controller 104A from the key store 110 and use the symmetric key to generate symmetric access data. The symmetric access data and payload data may be part of a symmetric message 164 sent to the system controller 104A.

The symmetric controller 104A receives the symmetric message 164 and requests that it be written to the symmetric memory device 114A. The symmetric memory device 114A controller 150A utilizes the symmetric engine 154A to verify the symmetric access data. Provided that the symmetric access data is verified, the controller 150A writes the payload data to the storage 152A.

Similarly, the system controller 104A generates a message directed to an external system, such as one of the external systems 118A, 118B. The processor unit 112A makes a read request to the symmetric memory device 114A, for example, with an indication that the requested payload data will be sent to an external system. The controller 150A retrieves the requested data from the storage 152A and generates symmetric access data based on the symmetric key of the symmetric memory device 114A. The system controller directs a symmetric message 166 to the gateway device 102.

The gateway device 102 utilizes the symmetric engine 136 to verify the symmetric access data and the asymmetric engine 134 to generate new asymmetric access data with the private key of the sym/asym memory device 108. The asymmetric access data and payload data may form an asymmetric message 168 sent to the external system.

Figure 3:
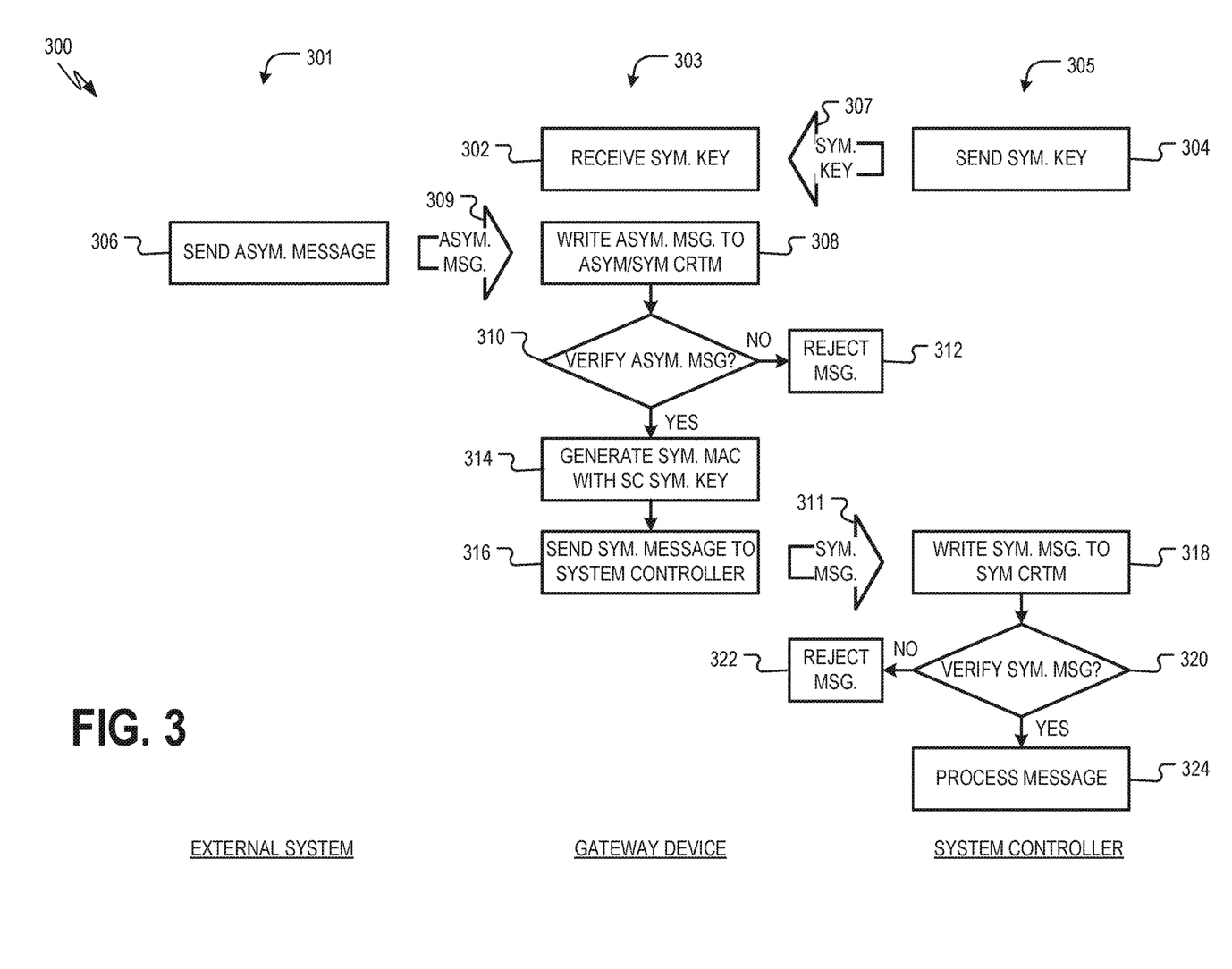
FIG. 3 is a flowchart showing one example of a process flow that may be executed by an external system, the gateway device, and the system controller of FIG. 1 to process an incoming message.

FIG. 3 is a flowchart showing one example of a process flow 300 that may be executed by an external system, the gateway device 102, and the system controller 104A to process an incoming message. The process flow 300 includes three columns 301, 303, 305. The column 301 includes operations that may be performed by an external system 118A. The column 303 includes operations that may be executed by the gateway device 102. The column 305 includes operations that may be executed by the system controller 104A. Although the process flow 300 is described with reference to a particular external system 118A, the gateway device 102, and a particular system controller 104A, it will be appreciated that other external systems 118A, other system controllers 104B, 104C, 104N and other gateway devices may be substituted in some examples.

At operation 304, the system controller 104A sends a symmetric key message 307 to the gateway device 102, which receives the symmetric key message at operation 302. Operations 302 and 304 are sometimes referred to as provisioning and may take place in various different ways. In some examples, provisioning occurs during an initial configuration of the processing system 101, for example, during or after the manufacturing of the processing system 101 or apparatus (e.g., vehicle, security system, etc.) managed by the processing system 101. For example, each system controller 104A, 104B, 104C, 104N may be configured to send respective symmetric keys to the gateway device 102 during the initial configuration. For example, the system controller 104A may receive a provisioning signal, from the gateway device 102 or another device. In response to the provisioning signal, the system controller 104A may send the symmetric key message 307 to the gateway device 102. In some examples, when the provisioning message is sent by a component other than the gateway device 102, the gateway device 102 may receive a gateway device provisioning signal simultaneously or near-in-time to the provisioning signal sent to the system controller 104A. The gateway device provisioning signal may prompt the gateway device 102 to expect the symmetric key message 307. In another example, provisioning may take place during a boot sequence sequence of the processing system 101. (A boot sequence may occur at various times including, for example, when the processing system 101 powered-on, when the processing system 101 is reset, etc.) For example, the gateway device 102 may be configured to send the provisioning signal to the system controllers 104A, 104B, 104C, 104N during a boot sequence. In some examples, the processing system 101 may be disconnected from the network 116 during provisioning so as to prevent third parties from intercepting symmetric keys sent via the communications bus 120.

In yet another example, symmetric keys for the system controllers 104A, 104B, 104C, 104N may be stored at a secure database or other secure storage, for example, external to the secure processing system 101. In lieu of (or in addition to) receiving the symmetric keys from the system controllers 104A, 104B, 104N, the gateway device 102 may receive the symmetric keys from the secure database or other secure storage. For example, the gateway device 102 may be configured to send a symmetric key request message to the secure database. In some examples, the symmetric key request message may include a symmetric or asymmetric access data generated as described herein. The secure database (and/or its associated system) may verify the symmetric key request and, if verified, send to the gateway device 102 the requested symmetric key or keys of the system controllers 104A, 104B, 104C, 104N.

Referring back to FIG. 3, at operation 306, the external system 118A may send an asymmetric message 309 to the gateway device 102. The asymmetric message 309 includes payload data and an asymmetric ACCESS DATA generated by the external system 118A with a private key of the external system 118A. The asymmetric message 309 may be addressed to the system controller 104A. In one example, the system controller 104A manages an anti-lock braking system of a vehicle, the asymmetric message 309 includes payload data including a status request message requesting a current firmware version, a status, or other information from the anti-lock braking system. In another example, the asymmetric message 309 may including payload data including a firmware or other software update for the system controller 104A. The asymmetric message 309 may be addressed specifically to the system controller 104A or in some examples may be addressed to more than one of the system controllers 104A, 104B, 104C, 104N. For example, the asymmetric message 309 may request information from or provide information or data to all or a subset of the system controllers 104A, 104B, 104C, 104N of the secure computing system.

At operation 308, the gateway device 102 may write the asymmetric message 309, or a portion thereof, to the sym/asym memory device 108. In some examples, the gateway device 102 writes the asymmetric message 309 to sym/asym memory device 108 with an instruction that the message 309 be forwarded to the system controller 104A. In examples where the asymmetric message 309 is addressed to more than one of the system controllers 104A, 104B, 104C, 104N, the gateway device 102 may write the asymmetric message 309 to the sym/asym memory device 108 with an instruction that the message 309 be sent to multiple system controllers 104A, 104B, 104C, 104N. In some examples, the full payload data is provided to each recipient system controller 104A, 104B, 104C, 104N. In other examples, the gateway device 102 divides the payload data and sends partial payload data to each recipient system controller 104A, 104B, 104C, 104N. For example, payload data including a firmware update for the system controller 104A may be sent to the system controller 104A, while payload data including a firmware update for another system controller 104B, 104C, 104N, etc., may not be sent to the system controller 104A.

At operation 310, the gateway device 102 (e.g., sym/asym memory device 108) may verify the asymmetric message 309. For example, the sym/asym memory device 108 may utilize the asymmetric engine 134 to verify that the asymmetric access data included with the asymmetric message 309 matches the payload data. In some examples, the sym/asym memory device 108 obtains a public key of the external system 118A, for example, from a certificate authority or other trusted third party. In some examples, the sym/asym memory device 108 is configured to verify messages from a limited set of external systems 118A, 118B. For example, if the asymmetric access data cannot be tied to the private key of an external system 118A, 118B of the limited set of external systems 118A, 118B, then it may not be verified. (Although two external systems 118A, 118B are shown in FIG. 1, the gateway device 102 may utilize a limited set of external systems including different numbers of external systems 118A, 118B.)

The sym/asym memory device 108 may provide the asymmetric access data and the public key to the asymmetric engine 134 (e.g., the math engine 138 thereof). The asymmetric engine 134 may return decrypted access data. The decrypted access data may reference or otherwise describe the payload data of the asymmetric message. For example, the decrypted message may be a hash of the payload data. The sym/asym memory device 108 may independently generate a hash of the payload data received with the asymmetric message 309 (which may be referred to as an access data copy). If the access data copy is equivalent to the decrypted access data, the asymmetric message 309 is verified. Any suitable asymmetric encryption technique may be used such as, for example, an RSA encryption technique. Also, the example described herein where the asymmetric access data is a hash of the payload data, encrypted with the external system's private key, is just one example for generating asymmetric access data. Other suitable techniques may be used.

If the asymmetric message 309 is not verified (e.g., if the access data copy is not equivalent to the decrypted access data), then the sym/asym memory device 108 may reject the message at operation 312. If the asymmetric message 309 is verified at operation 310, then the sym/asym memory device 108 may, at operation 314, generate symmetric access data for the system controller 104A. For example, the sym/asym memory device 108 may retrieve the symmetric key for the system controller 104A from the key store 110 at the storage 130 of the sym/asym memory device 108. In some examples, the sym/asym memory device may generate the symmetric access data utilizing the symmetric engine 136. For example, the sym/asym memory device 108 may provide the retrieved symmetric key of the system controller 104A and the payload data to the symmetric engine 136, which may return a hash of the payload data generated with the symmetric key of the system controller 104A. When less than all of the payload data of the message 309 is to be sent to the system controller 104A, the symmetric access data may be generated considering the portion of the payload data that is to be sent to the system controller 104A. Any suitable hashing algorithm may be used, such as, for example, a Secure Hashing Algorithm (SHA) algorithm including, for example, the SHA-2 series, the SHA-3 series, the SHA-5 series, etc.

At operation 316, the gateway device 102 (e.g., the sym/asym memory device 108) may send a symmetric message 311 to the system controller 104A. For example, the symmetric message 311 may include the payload data (or portion of the payload data to be provided to the system controller 104A) and the symmetric access data generated at operation 314.

The system controller 104A may receive the symmetric message 311 and write it to the symmetric memory device 114A at operation 318. At operation 320, system controller 104A (e.g., the symmetric memory device 114A) may verify the symmetric message 311. For example, the symmetric memory device 114A may determine whether the symmetric access data matches the payload data. The symmetric memory device 114A may process the write from operation 318 by providing the symmetric access data to the symmetric engine 154A. The symmetric engine 154A may generate a hash based on the payload data included in the symmetric message 311 and the symmetric key of the symmetric memory device 114A, for example, utilizing the same hashing algorithm used by the sym/asym memory device 108.

If the generated hash is equivalent to the symmetric access data, then the symmetric message 311 is verified. If the generated hash is not equivalent to the symmetric access data, then the symmetric message 311 may not be verified. If the symmetric message 311 is not verified, the symmetric memory device 114A may reject the message 311 at operation 322 (e.g., the payload data may not be loaded to the storage 152A). If the symmetric message 311 is verified, the symmetric memory device 114A may process the message 311, at operation 324, for example, by writing the payload data to the storage 152A.

Figure 4:
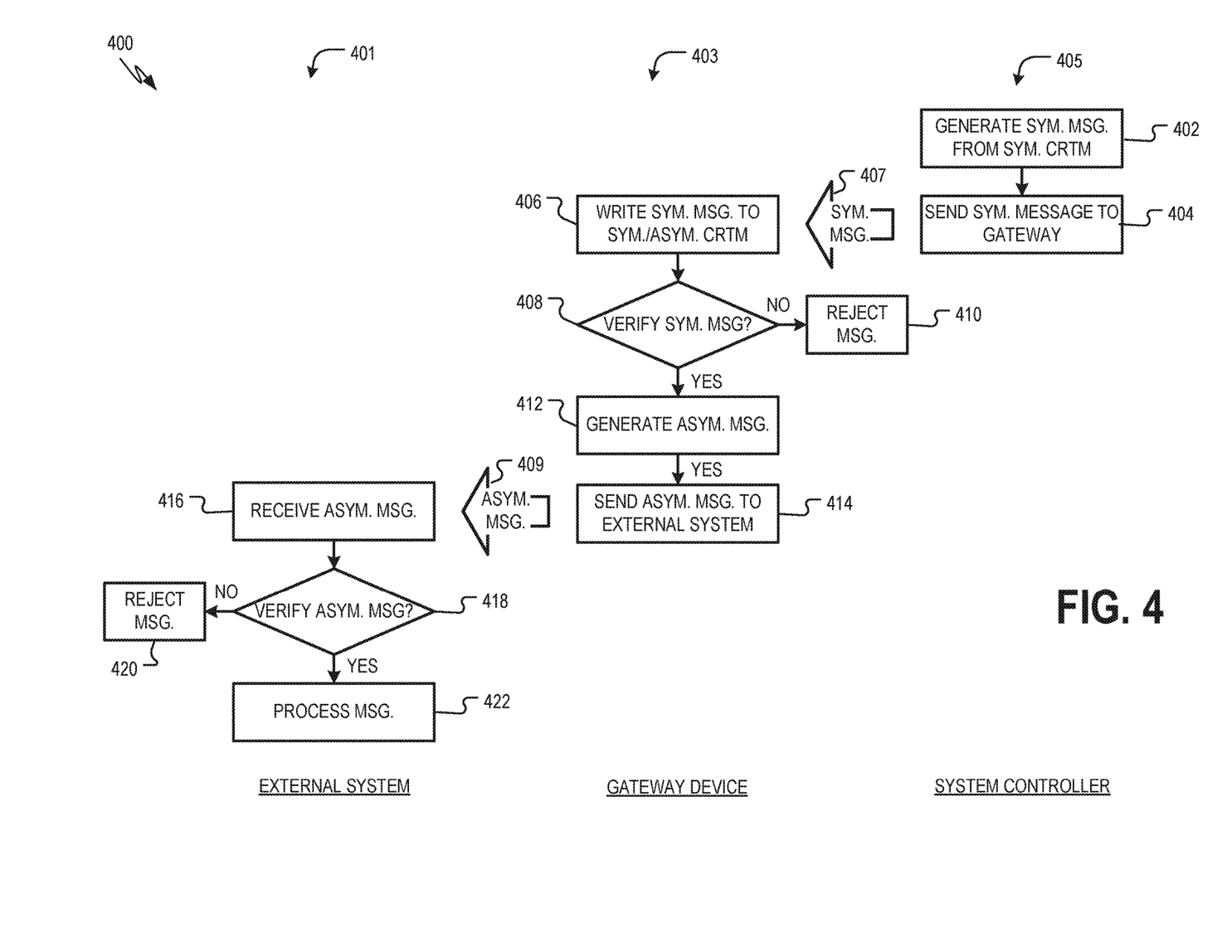
FIG. 4 is a flowchart showing one example of a process flow that may be executed by an external system, the gateway device, and the system controller of FIG. 1 to process an outgoing message.

FIG. 4 is a flowchart showing one example of a process flow 400 that may be executed by an external system 118A, the gateway device 102, and the system controller 104A to process an outgoing message. The process flow 400 includes three columns 401, 403, 405. The column 401 includes operations that may be performed by an external system 118A. The column 403 includes operations that may be executed by the gateway device 102. The column 405 includes operations that may be executed by the system controller 104A. Although the process flow 400 is described with reference to a particular external system 118A, the gateway device 102, and a particular system controller 104A, it will be appreciated that other external systems 118A, other system controllers 104B, 104C, 104N and other gateway devices may be substituted in some examples. Prior to the execution of the process flow 400, the symmetric key of the system controller 104A may have been provisioned to the gateway device 102, for example, as described herein.

At operation 402, the system controller 104A may generate a symmetric message 407 directed to the external system 118A. The symmetric message 407 may include payload data and a symmetric ACCESS DATA. The payload data may be any suitable data such as, for example, a status report of the system controller 104A, data from one or more sensors in communication with the system controller 104A, etc. In some examples, the system controller 104A generates the symmetric access data utilizing the symmetric engine 154A of the symmetric memory device 114A. For example, the system controller 104A may request the payload data from the symmetric memory device 114A. The symmetric memory device 114A may retrieve the payload data from storage 152A and provide the payload data to the symmetric engine 154A. The symmetric engine 154A may generate a hash of the payload data, for example, based on the symmetric key of the system controller 104A, which may be stored at the key register 156A. The hash may be all or a part of the symmetric access data.

At operation 404, the system controller 104A may send the symmetric message 407 to the gateway device 102. The gateway device 102 may write the symmetric message 407 to the sym/asym memory device 108 at operation 406. At operation 408, the gateway device 102 (e.g., the sym/asym memory device 108) may verify the symmetric message, for example, as described herein. For example, the gateway device 102 may retrieve the symmetric key for the system controller 104A from the key store 110 and, utilizing the symmetric engine 136, generate a hash of the payload data. If the hash of the payload data generated by the symmetric engine 136 is equivalent to the access data of the symmetric message 407, the message may be verified. If there is no match, the gateway device 102 may reject the symmetric message 407 at operation 410.

Provided that the symmetric message 407 is verified, the gateway device 102 may forward the message to the external system 118A. In some examples, asymmetric access data may be used. For example, at operation 412, the gateway device 102 (e.g., the sym/asym memory device 108) may generate an asymmetric message 409 including the payload data of the symmetric message 407. For example, the sym/asym memory device 108 may provide the payload data to the asymmetric engine 134. The asymmetric engine 134 may generate an asymmetric access data based, for example, on the payload data and a private key of the gateway device 102. For example, the sym/asym memory device 108 may generate a hash of the payload data and then encrypt the hash with the private key. The encrypted hash may be all or part of the asymmetric access data. At operation 414, the gateway device 102 may send the asymmetric message 409 to the external system 118A.

The external system 118A may receive the asymmetric message 409 at operation 416 and verify the message 409 at operation 418, for example, by determining if the asymmetric access data matches the payload data. If the message is verified, the external system may process the message at operation 422. If the message is not verified, the external system 118A may reject the message at operation 420.

The example secure processing system 101 described herein utilizes access control to protect the memory devices of the gateway device 102 and the system controllers 104A, 104B, 104C, 104N. For example, the gateway device 102 advantageously implements asymmetric access control on behalf of the system controllers 104A, 104B, 104C, 104N, as described. In this way, system controllers 104A, 104B, 104C, 104N may be implemented with symmetric rather than asymmetric system controllers.

In various examples, the secure processing system 101, including the gateway device 102 and various system controllers 104A, 104B, 104C, 104N, may implement other security features such as, for example, cryptographic measurement, cryptographic protection and/or automatic recovery.

According to cryptographic measurement, some or all of the memory devices 108, 114A, 114B, 114C, 114N utilize their respective symmetric engines (or additional symmetric engines) to implement a core root of trust for measurement (CRTM). For example, when a memory device receives verified payload data (e.g., verified as described herein), the memory device may utilize an appropriate cryptographic key (e.g., the devices symmetric key) to generate hashes of the payload data. The hashes may be written to a secure location at the memory device. In some examples, the cryptographic key is all or part of a CRTM, with the hashes derived therefrom. When data is read from the storage of the memory device, the memory device controller may compare the read data to the CRTM, for example, by hashing the read data and comparing the hash to the stored hash generated when the data was written. If there is a match, the process may continue (e.g., when the read data is code, the processor unit may execute the read code). If there is no match it may indicate a corruption of the memory device storage. The memory device may return an error or otherwise prevent the request data from be used.

According to automatic recovery, a memory device includes a secure (e.g., read-only) storage location that includes a secure, recoverable copy of all or a portion of the data and/or code for the system. If a data corruption is detected, for example, with reference to the CRTM, then the secure copy may be loaded (e.g., and executed). According to cryptographic protection, a symmetric and/or asymmetric cryptographic engine is used to encrypt communications (e.g., communications between the gateway device 102 and external systems 118A, 118B, communications between the system controllers 104A, 104B, 104C, 104N and the gateway device 102, etc.

Figure 5:
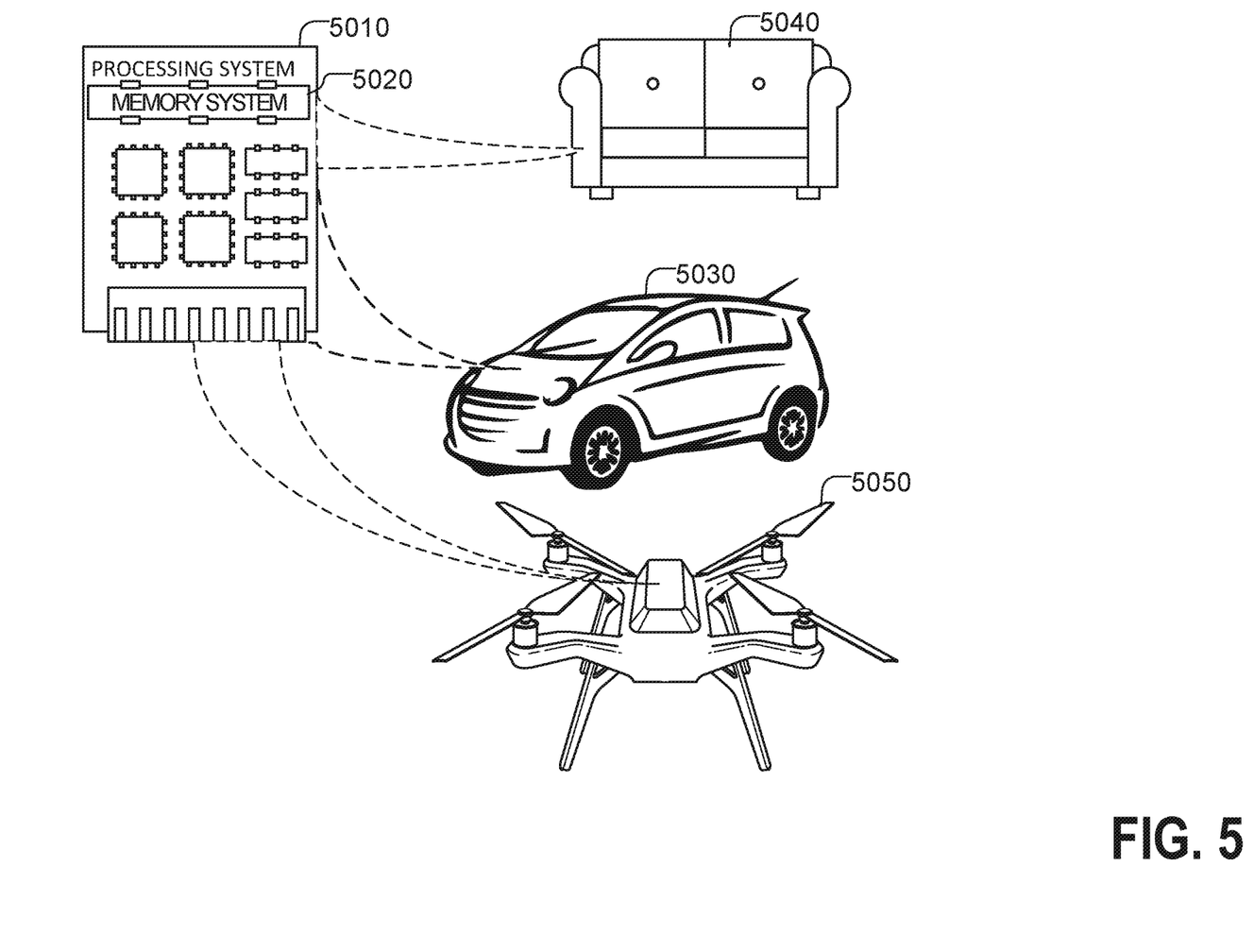
FIG. 5 shows an example processing system with a memory arrangement as part of one or more apparatuses.

FIG. 5 shows an example processing system 5010 (e.g., processing system 101) with a memory arrangement 5020 (e.g., any of the memory arrangements described herein) as part of one or more apparatuses 5030-5050. Apparatuses include any device that may include a processing system, such as processing system 5010. As previously noted, the processing system 5010 may be any device capable of executing instructions (sequential or otherwise). Example apparatuses include a vehicle 5030 (e.g., as part of an infotainment system, a control system, or the like), a drone 5050 (e.g., as part of a control system), furniture or appliances 5040 (e.g., as part of a sensor system, an entertainment or infotainment system), or the like. In other examples, although not shown, apparatuses may include aeronautical, marine, Internet of Things (IOT), and other devices.

Figure 6:
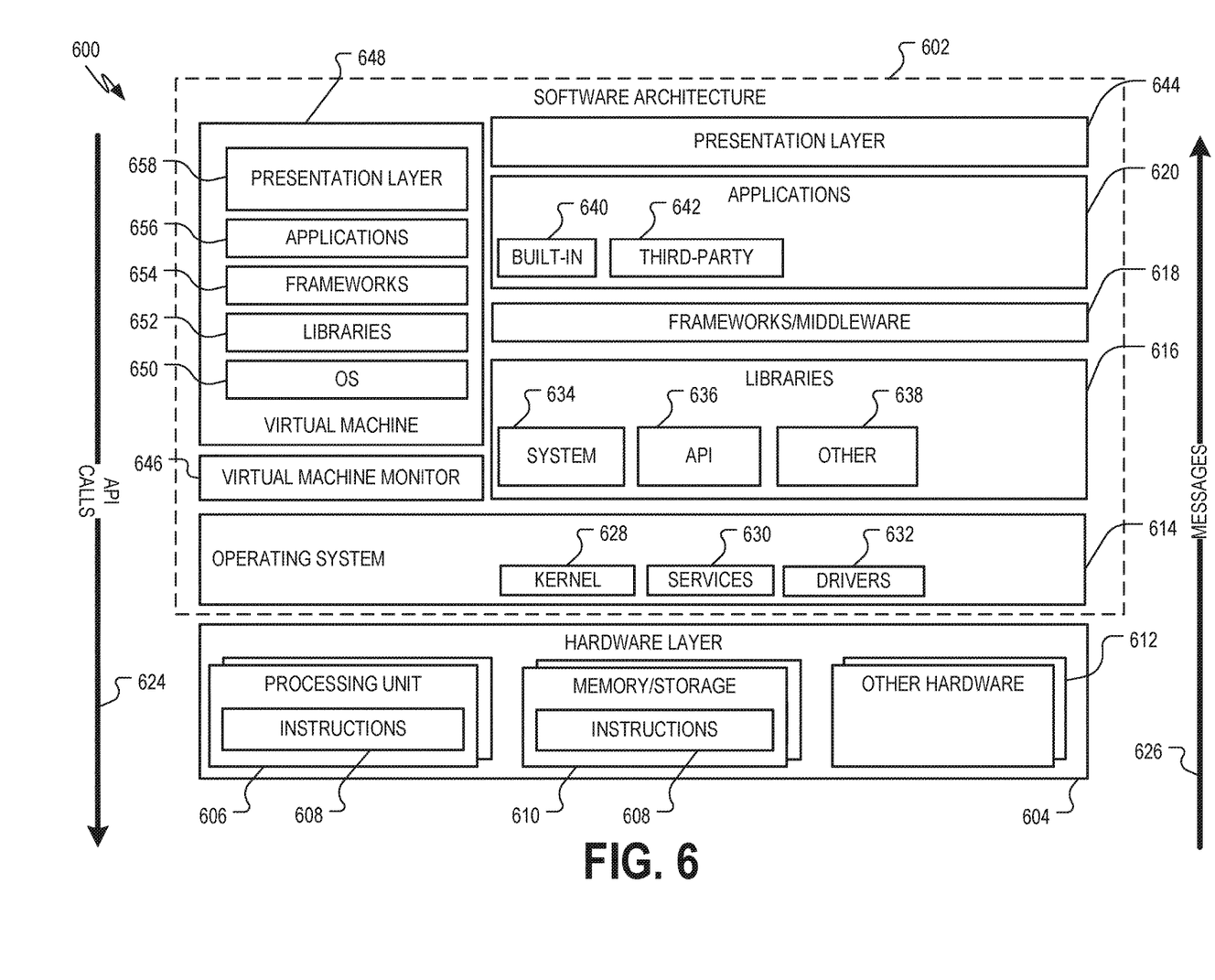
FIG. 6 is a block diagram showing one example of a software architecture for a computing device.

FIG. 6 is a block diagram 600 showing one example of a software architecture 602 for a processing device. The architecture 602 maybe used in conjunction with various hardware architectures. For example, the software architecture 602 may describe one or more of the gateway device 102 and/or the various system controllers 104A, 104B, 104C, 104N described herein. FIG. 6 is merely a non-limiting example of a software architecture 602 and many other architectures may be implemented to facilitate the functionality described herein. A representative hardware layer 604 is illustrated and may represent, for example, any of the above referenced computing devices. In some examples, the hardware layer 604 may be implemented according to the architecture 602 of FIG. 6, the architecture 700 of FIG. 7 and/or the architecture of the secure processing system 101 described herein.

The representative hardware layer 604 comprises one or more processing units 606 having associated executable instructions 608. Executable instructions 608 represent the executable instructions of the software architecture 602, including implementation of the methods, modules, components, and so forth of FIGS. 1-4. Hardware layer 604 also includes memory and/or storage modules 610, which also have executable instructions 608. Hardware layer 604 may also comprise other hardware as indicated by other hardware 612 which represents any other hardware of the hardware layer 604, such as the other hardware illustrated as part of hardware architecture 700.

In the example architecture of FIG. 6, the software 602 may be conceptualized as a stack of layers where each layer provides particular functionality. For example, the software 602 may include layers such as an operating system 614, libraries 616, frameworks/middleware 618, applications 620 and presentation layer 644. Operationally, the applications 620 and/or other components within the layers may invoke application programming interface (API) calls 624 through the software stack and receive a response, returned values, and so forth illustrated as messages 626 in response to the API calls 624. The layers illustrated are representative in nature and not all software architectures have all layers. For example, some mobile or special purpose operating systems may not provide a frameworks/middleware layer 618, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. In some examples, the services 630 include an interrupt service. The interrupt service may detect the receipt of a hardware or software interrupt and, in response, cause the architecture 602 to pause its current processing and execute an interrupt service routine (ISR) when an interrupt is received.

The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration The libraries 616 may provide a common infrastructure that may be utilized by the applications 620 and/or other components and/or layers. The libraries 616 typically provide functionality that allows other software modules to perform tasks in an easier fashion than to interface directly with the underlying operating system 614 functionality (e.g., kernel 628, services 630 and/or drivers 632). The libraries 616 may include system 634 libraries (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 9D in a graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The frameworks 618 (also sometimes referred to as middleware) may provide a higher-level common infrastructure that may be utilized by the applications 620 and/or other software components/modules. For example, the frameworks 618 may provide various graphic user interface (GUI) functions, high-level resource management, high-level location services, and so forth. The frameworks 618 may provide a broad spectrum of other APIs that may be utilized by the applications 620 and/or other software components/modules, some of which may be specific to a particular operating system or platform.

The applications 620 includes built-in applications 640 and/or third party applications 642. Examples of representative built-in applications 640 may include, but are not limited to, a contacts application, a browser application, a book reader application, a location application, a media application, a messaging application, and/or a game application. Third party applications 642 may include any of the built in applications as well as a broad assortment of other applications. In a specific example, the third party application 642 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third party application 642 may invoke the API calls 624 provided by the mobile operating system such as operating system 614 to facilitate functionality described herein.

The applications 620 may utilize built in operating system functions (e.g., kernel 628, services 630 and/or drivers 632), libraries (e.g., system 634, APIs 636, and other libraries 638), frameworks/middleware 618 to create user interfaces to interact with users of the system. Alternatively, or additionally, in some systems interactions with a user may occur through a presentation layer, such as presentation layer 644. In these systems, the application/module "logic" may be separated from the aspects of the application/module that interact with a user.

Some software architectures utilize virtual machines. For example, systems described herein may be executed utilizing one or more virtual machines executed at one or more server computing machines. In the example of FIG. 6, this is illustrated by virtual machine 648. A virtual machine creates a software environment where applications/modules may execute as if they were executing on a hardware computing device. A virtual machine is hosted by a host operating system (operating system 614) and typically, although not always, has a virtual machine monitor 646, which manages the operation of the virtual machine as well as the interface with the host operating system (i.e., operating system 614). A software architecture executes within the virtual machine such as an operating system 650, libraries 652, frameworks/middleware 654, applications 656 and/or presentation layer 658. These layers of software architecture executing within the virtual machine 648 may be the same as corresponding layers previously described or may be different.

Figure 7:
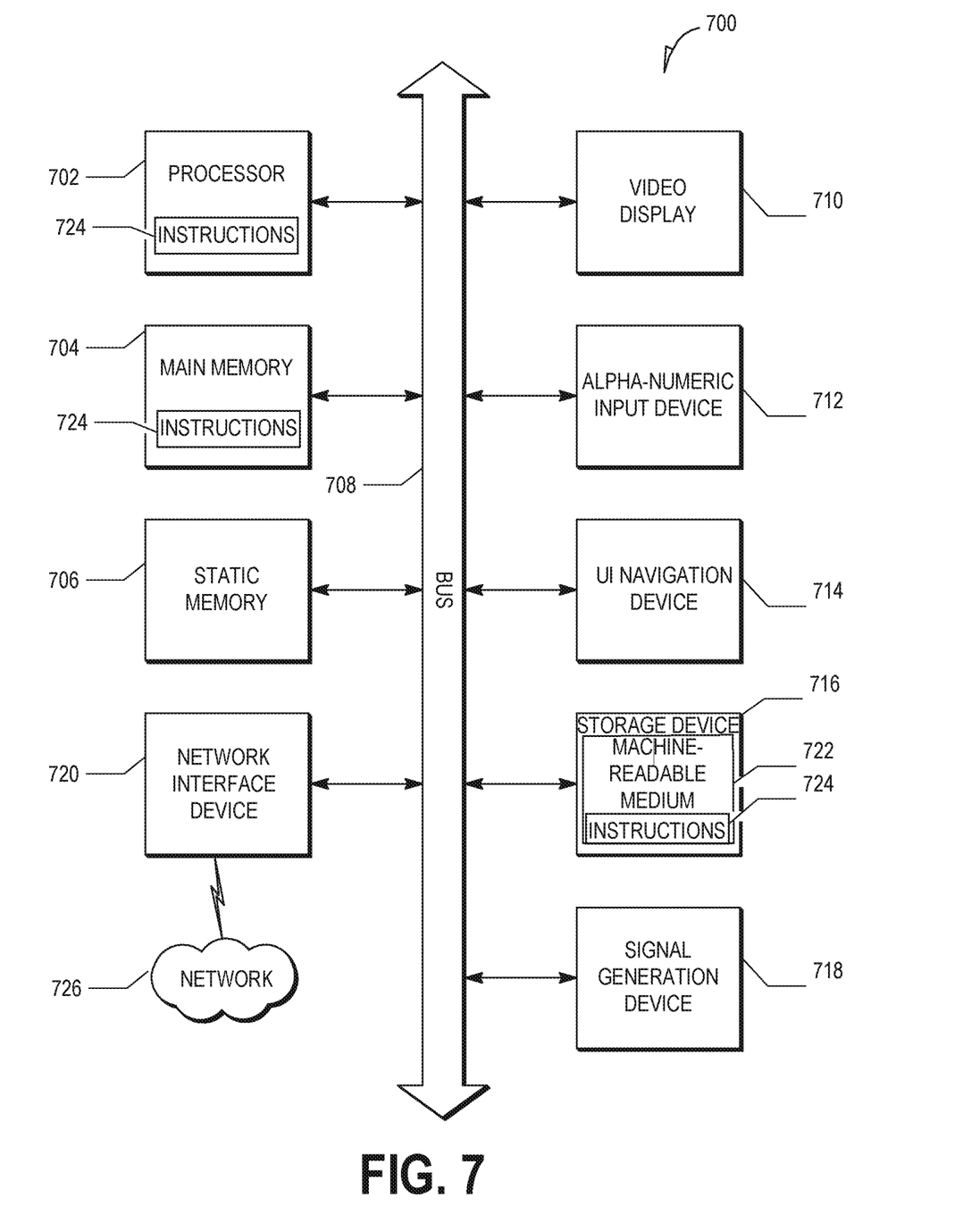
FIG. 7 is a block diagram illustrating a computing device hardware architecture, within which a set or sequence of instructions may be executed to cause the machine to perform examples of any one of the methodologies discussed herein.

FIG. 7 is a block diagram illustrating a processing system hardware architecture 700, within which a set or sequence of instructions may be executed to cause the machine to perform examples of any one of the methodologies discussed herein. For example, the architecture 700 may execute the software architecture 602 described with respect to FIG. 6. The architecture 700 may operate as a standalone device or may be connected (e.g., networked) to other machines. In a networked deployment, the architecture 700 may operate in the capacity of either a server or a client machine in server-client network environments, or it may act as a peer machine in peer-to-peer (or distributed) network environments. The architecture 700 may be implemented in a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify operations to be taken by that machine.

Example architecture 700 includes a processor unit 702 comprising at least one processor (e.g., a central processing unit (CPU), a graphics processing unit (GPU) or both, processor cores, compute nodes, etc.). The architecture 700 may further comprise a main memory 704 and a static memory 706, which communicate with each other via a link 708 (e.g., bus). The architecture 700 may further include a video display unit 710, an alphanumeric input device 712 (e.g., a keyboard), and a user interface (UI) navigation device 714 (e.g., a mouse). In some examples, the video display unit 710, input device 712 and UI navigation device 714 are incorporated into a touch screen display. The architecture 700 may additionally include a storage device 716 (e.g., a drive unit), a signal generation device 718 (e.g., a speaker), a network interface device 720, and one or more sensors (not shown), such as a global positioning system (GPS) sensor, compass, accelerometer, or other sensor.

In some examples, the processor unit 702 or other suitable hardware component may support a hardware interrupt. In response to a hardware interrupt, the processor unit 702 may pause its processing and execute an interrupt service routine (ISR), for example, as described herein.

The storage device 716 includes a computer readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the architecture 700, with the main memory 704, static memory 706, and the processor 702 also constituting computer readable media. Instructions stored at the computer readable medium 722 may include, for example, instructions for implementing the software architecture 602, instructions for executing any of the features described herein, etc.

While the computer readable medium 722 is illustrated in an example to be a single medium, the term "computer readable medium" may include a single medium or multiple media (e.g., a centralized or distributed database, and/or associated caches and servers) that store the one or more instructions 724. The term "computer readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "computer readable medium" shall accordingly be taken to include, but not be limited to, solid-state memories, and optical and magnetic media. Specific examples of computer readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 5G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Examples, as described herein, may include, or may operate on, logic or a number of components, engines, or modules, circuits, which for the sake of consistency are termed circuits, although it will be understood that these terms may be used interchangeably. Circuits may be hardware, software, or firmware communicatively coupled to one or more processors in order to carry out the operations described herein. Circuits may be hardware circuits, and as such circuits may be considered tangible entities capable of performing specified operations and may be configured or arranged in a certain manner. In an example, circuits may be arranged (e.g., internally or with respect to external entities such as other circuits) in a specified manner as a circuit. In an example, the whole or part of one or more computing platforms (e.g., a standalone, client or server computing platform) or one or more hardware processors may be configured by firmware or software (e.g., instructions, an application portion, or an application) as a circuit that operates to perform specified operations. In an example, the software may reside on a computer readable medium. In an example, the software, when executed by the underlying hardware of the circuit, causes the hardware to perform the specified operations. Accordingly, the term hardware circuit is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which circuits are temporarily configured, each of the circuits need not be instantiated at any one moment in time. For example, where the circuits comprise a general-purpose hardware processor configured using software; the general-purpose hardware processor may be configured as respective different circuits at different times. Software may accordingly configure a hardware processor, for example, to constitute a particular circuit at one instance of time and to constitute a different circuit at a different instance of time.

The above detailed description includes references to the accompanying drawings, which form a part of the detailed description. The drawings show, by way of illustration, specific examples that may be practiced. These examples are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other examples may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as examples may feature a subset of said features. Further, examples may include fewer features than those disclosed in a particular example. Thus, the following claims are hereby incorporated into the Detailed Description, with a claim standing on its own as a separate example. The scope of the examples disclosed herein is to be determined with reference to the appended claims, along with the full scope of equivalents to which such claims are entitled.

What is claimed is:

1. A system comprising:
a primary memory device in communication with at least one secondary memory device, the primary memory device configured to perform operations comprising:
receiving, from a first external system, a first write message comprising first message payload data, an indication of a first secondary memory device of the at least one secondary memory device, and first asymmetric cryptographic data;
verifying the first message payload data using the first asymmetric cryptographic data and a public cryptographic key associated with the first external system;
selecting, by the primary memory device and from a key store of the primary memory device, a first symmetric cryptographic key associated with the first secondary memory device, the selecting being based at least in part on the first write message;
generating first symmetric cryptographic data using the first message payload data and the first symmetric cryptographic key; and
sending the first message payload data and the first symmetric cryptographic data to the first secondary memory device to be stored at the first secondary memory device.

2. The system of claim 1, wherein the primary memory device is further configured to perform operations comprising:
sending a symmetric cryptographic key request to an external database; and
receiving from the external database a symmetric cryptographic key message comprising the first symmetric cryptographic key.

3. The system of claim 1, wherein the primary memory device is further configured to perform operations comprising:
receiving, from a second external system, a second message comprising second message payload data, second asymmetric cryptographic data, and an indication of a second secondary memory device;
verifying the second message payload data using the second asymmetric cryptographic data and a public cryptographic key associated with the second external system;
generating second symmetric cryptographic data using the second message payload data and a second symmetric cryptographic key associated with the second secondary memory device; and
sending the second message payload data and the second symmetric cryptographic data to the second secondary memory device.

4. The system of claim 1, wherein the primary memory device is further configured to perform operations comprising:
receiving from the first secondary memory device an output message directed to the first external system, the output message comprising output message payload data and output symmetric cryptographic data; and
verifying the output message payload data using the output symmetric cryptographic data and the first symmetric cryptographic key associated with the first secondary memory device.

5. The system of claim 4, wherein the primary memory device is further configured to perform operations comprising:
generating asymmetric output cryptographic data using the output message payload data and a private cryptographic key associated with the primary memory device; and
sending the output message payload data and the asymmetric output cryptographic data to the first external system.

6. The system of claim 1, wherein the primary memory device includes one or more processors executing instructions retained in the primary memory device to perform one or more of the operations.

7. The system of claim 1, wherein the primary memory device is in communication with at least the first secondary memory device through a bus, and wherein the first secondary memory device forms a portion of a control system in an automobile.

8. The system of claim 1, further comprising the first secondary memory device, wherein the first secondary memory device is configured to perform operations comprising:
receiving the first message payload data and the first symmetric cryptographic data;
verifying the first message payload data using the first symmetric cryptographic data and a copy of the first symmetric cryptographic key stored at the first secondary memory device; and
writing at least a portion of the first message payload data to the first secondary memory device.

9. The system of claim 8, wherein the first secondary memory device is further configured to perform operations comprising:
generating outgoing symmetric cryptographic data;
generating an outgoing message comprising outgoing message payload data, the outgoing symmetric cryptographic data, and an indication of the first external system; and
sending the outgoing message to the primary memory device.

10. The system of claim 1, further comprising the first secondary memory device, wherein the first secondary memory device is configured to perform operations comprising:
receiving a provisioning signal indicating a provisioning of the first symmetric cryptographic key; and
sending the first symmetric cryptographic key to the primary memory device.

11. The system of claim 10, wherein the provisioning signal indicates that power has been provided to the system.

12. A method comprising:
receiving, by a primary memory device and from a first external system, a first message comprising first message payload data, an indication of a first secondary memory device in communication with the primary memory device, and first asymmetric cryptographic data;
verifying the first message payload data by the primary memory device, the verifying using the first asymmetric cryptographic data and a public cryptographic key associated with the first external system;
selecting, by the primary memory device and from a key store of the primary memory device, a first symmetric cryptographic key associated with the first secondary memory device, the selecting being based at least in part on the first message;
generating first symmetric cryptographic data by the primary memory device, the generating using the first message payload data and the first symmetric cryptographic key; and
sending the first message payload data and the first symmetric cryptographic data by the primary memory device to the first secondary memory device.

13. The method of claim 12, further comprising:
sending a symmetric cryptographic key request by the primary memory device to an external database; and
receiving, by the primary memory device and from the external database, a symmetric cryptographic key message comprising the first symmetric cryptographic key.

14. The method of claim 12, further comprising:
receiving, by the primary memory device and from a second external system, a second message comprising second message payload data, second asymmetric cryptographic data, and an indication of a second secondary memory device;
verifying the second message payload data by the primary memory device, the verifying using the second asymmetric cryptographic data and a public cryptographic key associated with the second external system;
generating second symmetric cryptographic data by the second secondary memory device, the generating using the second message payload data and a second symmetric cryptographic key associated with the second secondary memory device; and
sending the second message payload data and the second symmetric cryptographic data by the primary memory device to the second secondary memory device.

15. The method of claim 12, further comprising:
receiving, by the primary memory device and from the first secondary memory device, an output message directed to the first external system, the output message comprising output message payload data and output symmetric cryptographic data; and
verifying the output message payload data by the primary memory device, the verifying using the output symmetric cryptographic data and the first symmetric cryptographic key associated with the first secondary memory device.

16. The method of claim 15, further comprising:
generating asymmetric output cryptographic data by the primary memory device, the generating using the output message payload data and a private cryptographic key associated with the primary memory device; and
sending the output message payload data and the asymmetric output cryptographic data by the primary memory device to the first external system.

17. The method of claim 12, further comprising:
receiving, by the first secondary memory device, the first message payload data and the first symmetric cryptographic data;
verifying, by the first secondary memory device, the first message payload data using the first symmetric cryptographic data and a copy of the first symmetric cryptographic key stored at the first secondary memory device; and
writing, by the first secondary memory device, at least a portion of the first message payload data to the first secondary memory device.

18. The method of claim 17, further comprising:
generating, by the first secondary memory device, outgoing symmetric cryptographic data;
generating, by the first secondary memory device, an outgoing message comprising outgoing message payload data, the outgoing symmetric cryptographic data, and an indication of the first external system; and
sending the outgoing message, by the first secondary memory device to the primary memory device.

19. The method of claim 12, further comprising the first secondary memory device, wherein the first secondary memory device is configured to perform operations comprising:
receiving, by the first secondary memory device, a provisioning signal indicating a provisioning of the first symmetric cryptographic key; and
sending the first symmetric cryptographic key by the first secondary memory device to the primary memory device.

20. The method of claim 19, wherein the provisioning signal indicates that power has been provided to a system comprising the primary memory device and the first secondary memory device.

21. A non-transitory computer-readable medium comprising instructions thereon that, when executed by a computing device comprising one or more processors, cause the computing device to perform operations comprising:
receiving, from a first external system, a first message comprising first message payload data an indication of a first secondary memory device in communication with the computing device and first asymmetric cryptographic data;
verifying the first message payload data using the first asymmetric cryptographic data and a public cryptographic key associated with the first external system;
selecting from a key store of the computing device a first symmetric cryptographic key associated with the first secondary memory device, the selecting being based at least in part on the first message;
generating first symmetric cryptographic data using the first message payload data and the first symmetric cryptographic key; and sending the first message payload data and the first symmetric cryptographic data to the first secondary memory device.

\* \* \* \* \*